Nov. 7, 1950

W. L. NIELAND ET AL 2,529,177

CORROSION AND TUBERCULATION INHIBITION IN WATER SYSTEMS

Filed Dec. 6, 1947

INVENTORS
WILLIAM L. NIELAND
JOHN J. MAGUIRE
CHARLES B. GEORGE
BY HARRY L. KAHLER

Harry Ernest Rubens
ATTORNEY

Nov. 7, 1950 W. L. NIELAND ET AL 2,529,177
CORROSION AND TUBERCULATION INHIBITION
IN WATER SYSTEMS
Filed Dec. 6, 1947 2 Sheets-Sheet 2

INVENTORS
WILLIAM L. NIELAND
JOHN J. MAGUIRE
CHARLES B. GEORGE
BY HARRY L. KAHLER

Harry Ernest Rubens
ATTORNEY

Patented Nov. 7, 1950

2,529,177

UNITED STATES PATENT OFFICE 2,529,177

CORROSION AND TUBERCULATION INHIBITION IN WATER SYSTEMS

William L. Nieland, Downers Grove, Ill., and John J. Maguire, Elkins Park, Charles B. George, Philadelphia, and Harry L. Kahler, Feasterville, Pa., assignors to W. H. and L. D. Betz, Philadelphia, Pa., a firm Application December 6, 1947, Serial No. 790,087

10 Claims. (Cl. 210—23)

Our invention relates to the protection of metals, particularly ferrous metals, from waterside corrosion in water systems.

The present methods in commercial use in municipal and industrial fields employ the alkalies, silicates and phosphates. The principal objects of our invention consist in providing an inhibitor which will afford better protection, employing lower concentrations and at lower cost than that secured by previous known materials. Additional objects are, to provide an inhibitor having the physical and chemical characteristics, in the effective concentration required, of being non-toxic; and capable of being advantageously used without materially affecting the hardness, the total ion content, or the pH of the water; which may be effectively employed regardless of the hardness of the waters ordinarily encountered in water systems; and which would, in the once-through requirement of the continuously moving water be effective, in low concentrations to inhibit the further corrosion and tuberculation in existing systems.

Tuberculation in domestic and municipal systems reduces the effective inside diameter and carrying capacity of the pipe, resulting in excessive pressure losses and increased pumping costs. Eventually, a point is reached where costly cleaning must be attempted or the equipment replaced. "Red water" also results from the sloughing off of this tuberculation. A further object is to provide a product having the aforesaid characteristics which will remove existing tuberculation products.

We are aware that hydroxy polycarboxylates have been used for softening water; in antifreeze solutions; in oils, both fuel and lubricating, etc. Our investigations have shown that in water, these carboxylates act unexpectedly either as corrosion inhibitors or as corrosive agents, depending on the concentrations employed, and that in fact, there exists a certain range of effectiveness in the low concentrations within which range a maximum degree of protection is obtained against corrosion and tuberculation. Our investigations indicated a loss of the benefits derived as the concentrations are increased or diminished from the indicated range. In such instances, the inhibitory function ceases, and in the higher concentrations, corrosion is actually assisted. It was further determined that a certain critical limitation exists within the range of effectiveness, wherein pitting of the metal takes place, which may result in perforation of the metal wall, despite a showing of a percent saving of the metal in the system. We have thus learned that the ultimate protection obtained is neither a linear nor a continuous function of the concentrations employed.

Within the aforementioned range of concentrations, we have ascertained that the inhibitors employed by us create on the metal surface a hard impervious layer tightly bonded to the metal. After reaching a thickness noticeable to the unaided eye, the layer ceases to increase in thickness. This layer when completely formed, acts as a physical barrier to corrosion and further prevents the formation of the undesirable tuberculation on the metal in water systems. Outside the critical range, this protective layer does not form. Still further objects therefore consist in determining (a) the exact conditions under which the protective layer can be established, (b) the minimum and maximum values of concentrations within the beneficial range and (c) the critical pitting limitation.

We accomplish these and other objects as will be apparent from a consideration of the substances used, the methods of employing them, and the results obtained, as disclosed in the following specification, particularly pointed out in the attached claims and illustrated in the accompanying drawings in which:

Figure 5:
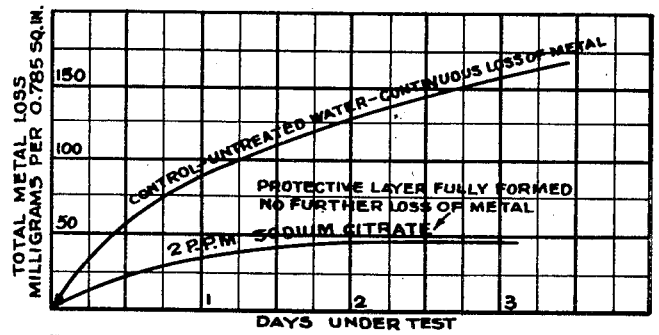

Fig. 5 is a chart comparing the total milligram metal loss for successive days under test of 2 P. P. M. of sodium citrate to a control specimens in untreated water.

Figure 6:
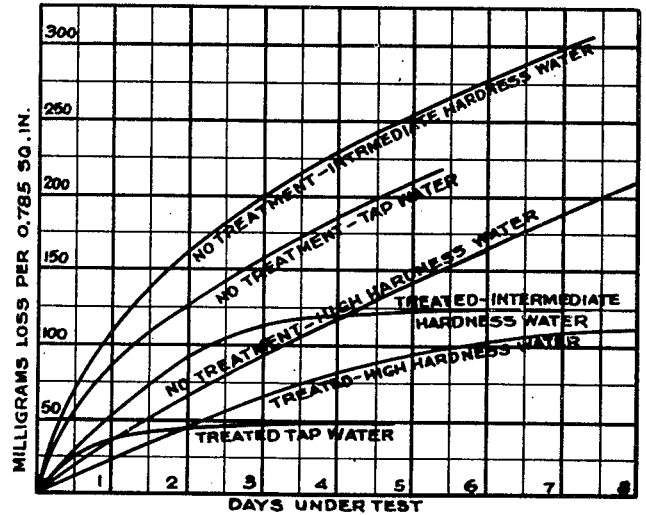

Fig. 6 is a chart comparing the total milligram loss for successive days under test of 2 P. P. M. of sodium citrate in waters of various hardnesses and corresponding control specimens.

Figure 7:
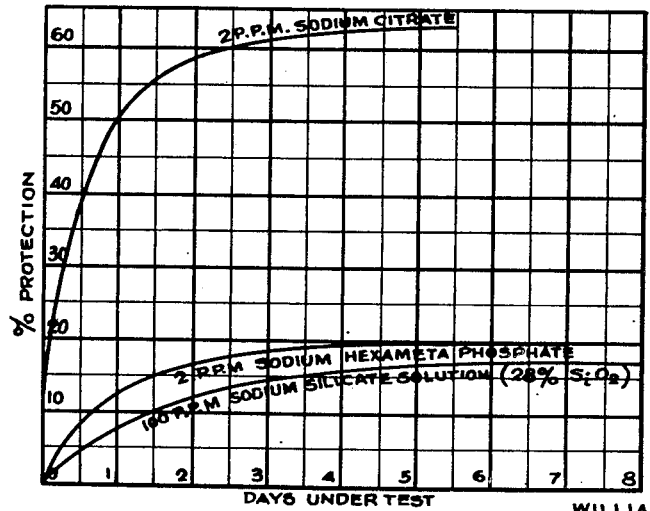

Fig. 7 is a chart comparing the percent protection for successive days under test afforded by 2 P. P. M. of sodium citrate with 100 P. P. M. sodium silicate, 2 P. P. M. sodium hexametaphosphate and the control specimen in untreated water.

Figure 1:
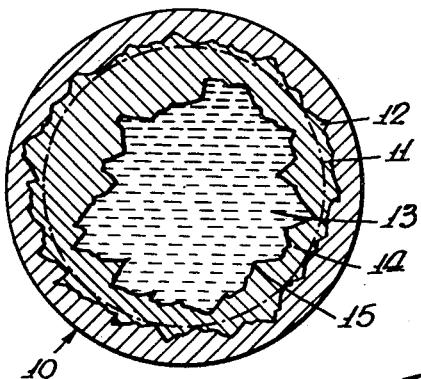
Fig. 1 is a cross-sectional view of a metal water-pipe disclosing the character of the tuberculation and corrosion normally resulting from conducting untreated water therethrough.

In Figure 1, we have illustrated a cross section of typical iron pipe 10 wherein the original inside surface 11, indicated by dot-dash lines has been corroded and the thickness of the pipe reduced by the areas indicated by reference numeral 12. The original hollow portion of the pipe containing the water 13 has diminished in cross-sectional area by the tuberculation 14 until the water carrying surface 15 has been formed. As was previously indicated, the reduction of the effective inside diameter lowers the water carrying capacity of the pipe.

Figure 2:
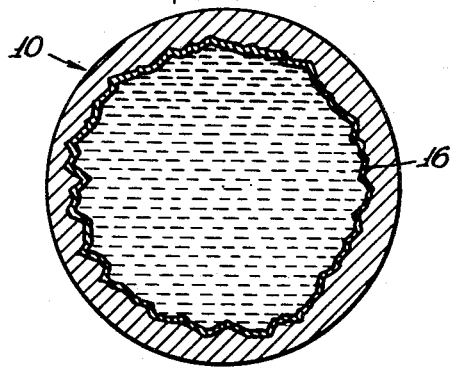
Fig. 2 is a similar view of the pipe of Fig. 1 after continuous treatment by our method resulting in the formation of a protective layer and the removal of the tuberculation products.

In Fig. 2, the same pipe 10 is shown after treatment by our method. The treatment can be fed to the water system in any of the common commercial methods used for this purpose. A gravity drip feed can be used where applicable as can chemical pumps, by-pass feeders, eductors, or any type of solution feeder. The protective layer 16 is formed under the porous tuberculation products, ultimately resulting in the elimination of the tuberculation products and providing an increased water carrying capacity for the same pipe.

Figure 3:
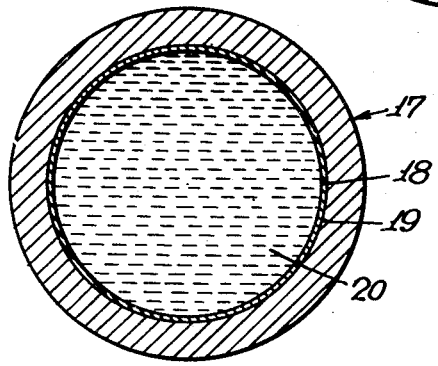
Fig. 3 is a cross-sectional view of a metal water pipe subjected, from its original installation, to continuous treatment by our method.

In Figure 3, a section of new iron pipe 17 is shown provided with a protective layer 18 on the inner surface 19. The protective layer laid down on the metal underneath the water 20 by our method, has been found to inhibit effectively corrosion and tuberculation. As a result, the carrying capacity of the pipe remains substantially at its original maximum, and the problems of corrosion and tuberculation are avoided.

Figure 4:
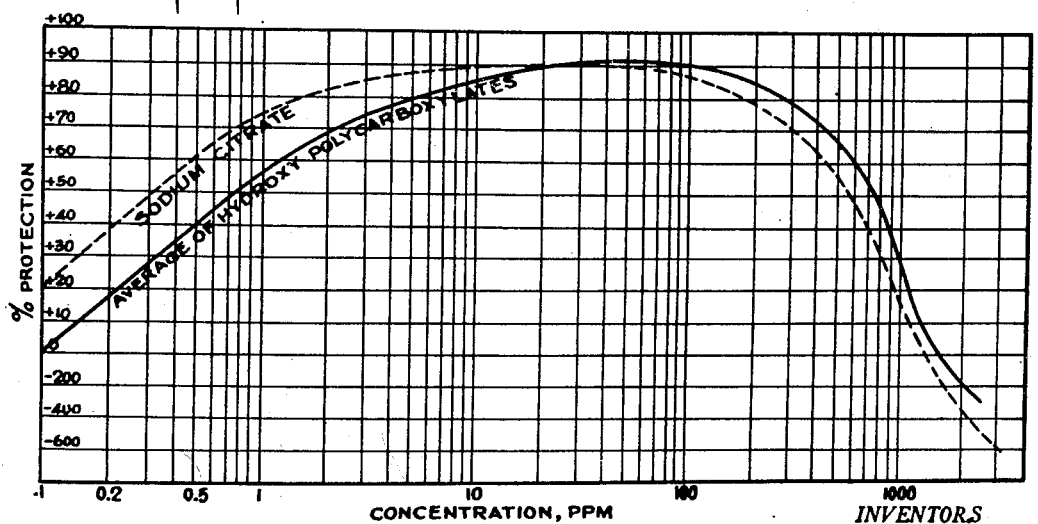
Fig. 4 is a graph showing the variation in the percent metal saving afforded by the average inhibitor employed by us, compared with that obtained by sodium citrate.

In Figure 4, we have charted the results of a series of tests using sodium citrate for various concentrations indicating the percent protection on an iron pipe specimen afforded for each concentration, and also indicated the average corresponding results of the sodium salts of all the hydroxy polycarboxylates tested. Percent protection as used in Fig. 4 is equal to:

$$\frac{100 \times \text{weight loss of control minus weight loss with inhibitor}}{\text{weight loss of control}}$$

By weight loss of control is meant the weight loss sustained by the corrosive specimen when no treatment is employed. In these tests, conducted with a continuous flow system, using Philadelphia tap water at 3.5 feet per second, at 120° F., containing 5.5 P. P. M. dissolved oxygen, and employing ferrous specimens, it is evident that there exists a zone of protection between from about .1 P. P. M. to about 1000 P. P. M. Below the minimum and above about 1000 P. P. M., no protection was afforded, and corrosion was not inhibited. In fact, beyond concentrations of about 1000 P. P. M. the aforesaid materials tested actually assisted corrosion as indicated by the negative protection against metal loss. The beneficial zone indicated in Fig. 4 was found to be independent of the type and temperature of the water. Further investigations indicated that the ferrous specimens subjected to concentrations in the beneficial zone exhibited a dense dark coating which had a visible thickness. The coating is an iron compound, smooth, resistant to penetration by liquids, and so firmly bonded to the metal that its removal by physical and chemical means is exceedingly difficult. The inhibitor readily penetrates the porous tuberculation on corroded metal formed in the absence of hydroxy polycarboxylates and builds up a protective layer underneath and on the metal surface, which prevents further corrosion and tuberculation. With continuous treatment, the original products are gradually removed and passage of water made easier. The protective layer does not form below .1 P. P. M. or above about 1000 P. P. M. and protection against corrosion does not exist without the protective layer. The maximum degree of protection as measured by the percent metal saving was obtained in the vicinity of 100 P. P. M. It was also found that above about 100 P. P. M., the increase in concentration was accompanied by a pitting of the metal which, over a period of time, would cause a perforation in the metal wall of the specimen. Thus, the apparent upper beneficial range of about 1000 P. P. M. is limited actually to about 100 P. P. M. for the average of the hydroxy polycarboxylates. The practical range, therefore, operates from about .1 P. P. M. to about 100 P. P. M., the cost thereafter rising as the benefits decreased. It is also evident from the results that protection is neither a linear nor a continuous function of the concentration.

The rate at which the protective layer forms for successive days of treatment is shown in Fig. 5 where the total metal loss in milligrams per 0.785 sq. in. area is shown for 2 P. P. M. of sodium citrate, as compared to a control in untreated water, using Philadelphia tap water flowing continuously at 3.5 feet per second, having a temperature of 120° F. The protective layer reaches a maximum thickness in a few days then stops forming giving maximum protection, compared to the continual losses in the control. After the protective layer is formed, the treatment in the water is needed to maintain that layer continuously in its best protective condition. The thick accumulations of corrosion products on the control is able to slow the rate of the loss of metal slightly from the first to the third day after which the rate is practically constant. As the accumulation of products increases in the control specimen, some of it is able to break away from the pipe and give rise to "red water." The adherent protective layer laid in the treated pipe using 2 P. P. M. sodium citrate within 6 days reduces the rate of metal loss to almost nothing. Tuberculation and "red water" formation are also prevented.

That the protective layer is so adherent and tough that it can exist safely for short periods of time without treatment was proven by continuous flow experiments. These results are shown in the following table:

TABLE I

| Specimen | Ave. Total Loss, Mgs. Per 0.785 Sq. In. Area | Per Cent Protection |
|---|---|---|
| Immersed 7 days without treatment | 358 | |
| Immersed 7 days with 2 P.P.M. Sod. Citrate | 121 | 66 |
| Immersed 5 days with 2 P.P.M. Sod. Citrate and 2 days without treatment | 153 | 57 |

Water: Philadelphia tap water.
Temperature: 120° F.

The protective layer put on the metal pipe by water containing 2 P. P. M. of sodium citrate treatment was so adherent and protective that the absence of treatment for two days caused only a small increase in the milligrams of metal loss over the specimens exposed to the treatment for the full 7 days. However, we do not advise omitting treatment for this length of time if continued maximum protection is desired, but recommend regulating the treatment so that the predetermined concentration level is always maintained.

That a protective layer is laid in all types of water is shown in Fig. 6. In this test, the three types of water used are indicated:

TABLE II
Analyses of waters used in Fig. 6

| | Phila. Tap Water | Intermediate Hardness Water | High Hardness Water |
|---|---|---|---|
| Total Hardness as $CaCO_3$ | ¹42 | ²100 | ²350 |
| Calcium as $CaCO_3$ | 30 | 70 | 250 |
| Magnesium as $CaCO_3$ | 12 | 30 | 100 |
| P alkalinity as $CaCO_3$ | 0 | 0 | 0 |
| M alkalinity as $CaCO_3$ | 20 | 50 | 150 |
| Chloride as Cl | 10 | 51 | 225 |
| Sulfate as $SO_4$ | 30 | 65 | 230 |
| pH | 6.7 | 6.7 | 7.4 |
| Iron as Fe | 0.3 | 0.3 | 0.3 |
| Silica as $SiO_2$ | 5.0 | 5.0 | 5.0 |

¹ Representative of a typical soft water.
² Average obtained from U. S. Geological Survey.

P alkalinity as $CaCO_3$ is alkalinity to phenolphthalein end point. M alkalinity as $CaCO_3$ is alkalinity to the methylorange end point.

The curves of the treated water using 2 P. P. M. sodium citrate all leveled in a matter of days. The curves show that water with lower hardness sets up a film faster than water with increased hardness. However, the effectiveness of the protective layer after formation in preventing further metal loss is about the same regardless of hardness of the water flowing through the pipe, as the important point is the fact that metal loss is substantially reduced to zero.

It will be noted that the specimen in untreated water of intermediate hardness possessed the greater corrosivity as indicated by the greatest metal loss. Such an increased corrosivity load may occur in a recycling system, i. e. one in which evaporation of water takes place, and it is apparent that the treatment of 2 P. P. M. of sodium citrate is satisfactory in combating the increased corrosion load that may arise as a result of recycling systems.

Our discovery has practical application because of its superiority over the two most commonly used treatments on the market today. Figure 7 shows the comparative results with 2 P. P. M. of sodium citrate, 2 P. P. M. of sodium hexametaphosphate and 100 P. P. M. of liquid sodium silicate (28% $SiO_2$) with Philadelphia tap water at 160° F. and 3.8 ft./sec. flow. This shows that sodium citrate is able to maintain its efficiency at a higher temperature. The hydroxy polycarboxylates not only achieve a protective layer sooner but give 60–70% protection in the first few days compared to 20% or less for existing treatments. If the sodium citrate curve in Fig. 7 were corrected for initial losses, the percent protection would be as high as that shown in Fig. 4.

Our use of the hydroxy polycarboxylic acids in place of the non-substituted acids have a sound basis as shown in the following table:

TABLE III

Effect of number of hydroxyls on inhibition

| Type | Name | Structure | No. of OH¹ | Per Cent Metal Protection |
|---|---|---|---|---|
| Di | Succinic | HOOC—$CH_2$—$CH_2$—COOH | 0 | 42 |
| | Malic | HOOC—CHOH—$CH_2$—COOH | 1 | 67 |
| | Tartaric | HOOC—CHOH—CHOH—COOH | 2 | 76 |
| Di | Adipic | HOOC—$(CH_2)_4$—COOH | 0 | 16 |
| | Mucic | HOOC—$(CHOH)_4$—COOH | 4 | 70 |
| Tri | Tricarballylic | (structure) | 0 | 39 |
| | Citric | (structure) | 1 | 72 |

¹ Exclusive of OH in the carboxyl.

It is to be noted that the foregoing hydroxy polycarboxylates all have six or less carbon atoms and that these are the hydroxy polycarboxylates which we have found to be particularly effective.

Unsubstituted polycarboxylic acids have but a small fraction of the inhibitory power of the hydroxy acids. Thus, malic and tartaric acids which are respective mono-hydroxy and di-hydroxy succinic acid gave far superior results than unsubstituted succinic acid. Further increase in the number of hydroxyls showed even greater benefits in the comparison of adipic and mucic acids where the latter gave four times the power of inhibition as adipic. In the tricarboxylic acid group, citric with 1 OH additional doubled the protection of tricarballylic acid.

As a result of our investigation, the following acids, and their soluble metal salts have been discovered to possess the properties sought after, and exhibited similar critical ranges of effectiveness.

a. Citric acid
b. Tartaric acid
c. Malic acid
d. Mucic acid.

Of these, citric acid and its soluble metal salts give the best protection because their protective layers are the most adherent, most compact and most impervious of them all; tartaric and mucic are almost as good, with malic following in line with less desirable qualities although furnishing satisfactory results.

Although we have used steel in the particular experiments illustrated in proving that hydroxy polycarboxylic acids are excellent corrosion inhibitors, these acids and their soluble metal salts are protective to other metals as well.

In the practical use of hydroxy polycarboxylic acids for prevention of corrosion and elimination of tuberculation in municipal and domestic practice, the effects of these acids and their salts on the quality of the resulting water has been considered. Using citric acid as an example in Philadelphia tap water in concentrations of 10, 50 and 100 P. P. M. these concentrations improved the taste. Use of citric acid or sodium citrate doesn't alter the chemical characteristics of the water to any significant degree and in using these acids or salts for corrosion prevention, it is not necessary to alter the water's pH or to soften it or to generally in any way change its original concentrations. The treatment functions primarily by laying a protective film on the metal in the critical range of concentrations hereinbefore set forth. In the practical application of the hydroxy polycarboxylates a selection of concentrations should be made based on the temperature, contacting area and rate of flow of the system involved.

In general, once the film has been established, the most economical practice in using sodium citrate for corrosion prevention is to reduce the concentration used to that amount wh'ch will continuously maintain the film as shown by little or no corrosion loss of test specimens. In systems with high rate of flow such as 3.5 ft. per second and more, sodium citrate may be reduced to values as low as 0.1 P. P. M. while in systems of lower flow such as 0.5 ft. per second or less, it may be necessary to maintain higher concentrations.

Certain industrial processes such as dyeing, tanning, paper manufacture, etc. require waters of varying alkalinity, pH, and ion content for best results. The beneficial action of the inhibitor will be obtained despite the variation in the water characteristics.

Throughout the specification and claims wherever the term hydroxy polycarboxylates is used, it is intended to include all hydroxy polycarboxylic acids and their soluble salts.

We have thus described our invention, but we desire it understood that it is not confined to the particular materials and methods shown and described, the same being merely illustrative, and that the invention may be carried out in other ways without departing from the spirit of our invention, and therefore, we claim broadly the right to employ all equivalent materials and methods coming within the scope of the appended claims, and by means of which, objects of our invention are attained and new results accomplished, as it is obvious that the particular materials and methods herein shown and described are only some of the many that can be employed to attain these objects and accomplish these results.

Having described our invention, what we claim and desire to secure by Letters Patent, is as follows:

1. The method of inhibiting water-side metallic corrosion in a water system which comprises the steps of flowing the water through a metal pipe or other container, and adding to the water in the system a hydroxy polycarboxylate having no more than six carbon atoms to form a concentration in the water of about from .1 to 100 P. P. M.

2. The method of inhibiting water-side ferrous corrosion in a water system which comprises the steps of flowing the water through a ferrous metal pipe or other container, and adding to the water in the system a hydroxy polycarboxylate having no more than six carbon atoms to form a concentration in the water of from about .1 to 100 P. P. M.

3. The method of claim 2 in which the hydroxy polycarboxylate is citric acid.

4. The method of claim 2, in which the hydroxy polycarboxylate is tartaric acid.

5. The method of claim 2 in which the hydroxy polycarboxylate is sodium citrate.

6. The method of removing tuberculation from the ferrous metal surfaces of water systems which comprises flowing the water through a ferrous pipe or other container having tuberculation products formed thereon adding to the water in the system in amounts of from .1 to 1000 P. P. M. a hydroxy polycarboxylate having no more than six carbon atoms and continuously subjecting the tuberculation products in the system to water containing the hydroxy polycarboxylate until the tuberculation products are removed.

7. The method of inhibiting water-side ferrous metal corrosion in a water system which comprises the steps of flowing the water through a ferrous metal pipe or other container, and adding a hydroxy polycarboxylate having no more than six carbon atoms to the water in the system in amounts of from .1 to 1000 P. P. M. for a period of time sufficient to form a protective coating on the ferrous metal that is resistant to water-side corrosion.

8. The method of inhibiting water-side ferrous metal corrosion in a water system which comprises the steps of flowing the water through a ferrous metal pipe or other container, and adding a hydroxy polycarboxylate having no more than six carbon atoms in amounts not greater than 1000 P. P. M. to the water in the system for a period of time, sufficient to form a protective coating on the metal and thereafter maintaining the coating by adding to the water a decreased concentration of the hydroxy polycarboxylate in amounts not greater than 100 P. P. M.

9. The method of inhibiting water-side ferrous corrosion in a water system which comprises the steps of flowing the water through a ferrous metal pipe or other container, and adding malic acid to water in the system to form a concentration in the water of from about .1 to 100 P. P. M.

10. The method of inhibiting water-side ferrous corrosion in a water system which comprises the steps of flowing the water through a ferrous metal pipe or other container, and adding mucic acid to water in the system to form a concentration in the water of from about .1 to 100 P. P. M.

WILLIAM L. NIELAND.
JOHN J. MAGUIRE.
CHARLES B. GEORGE.
HARRY LEWIS KAHLER.

REFERENCES CITED

The following references are of record in the file of this patent:

UNITED STATES PATENTS

| Number | Name | Date |
| --- | --- | --- |
| 2,311,008 | Tucker | Feb. 16, 1943 |
| 2,311,653 | Farrington | Feb. 23, 1943 |
| 2,324,577 | Haffner et al. | July 20, 1943 |
| 2,334,158 | Fuchs et al. | Nov. 9, 1943 |
| 2,343,569 | Neeley et al. | Mar. 7, 1944 |
| 2,349,044 | Jahn | May 16, 1944 |
| 2,371,142 | Barnum et al. | Mar. 13, 1945 |
| 2,391,895 | Gunderson | Jan. 1, 1946 |
| 2,477,851 | Arent | Aug. 2, 1949 |